Figure 1:
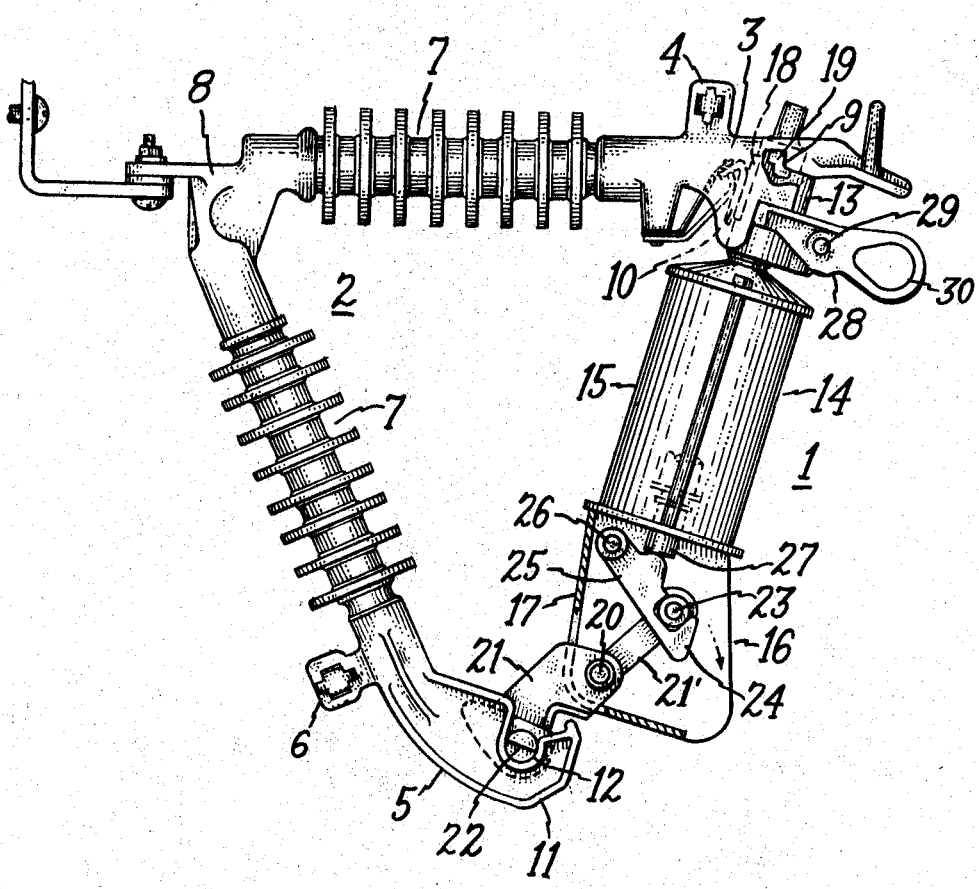

May 23, 1967 S. R. SMITH, JR 3,321,721
SECTIONALIZER FOR OPEN CUTOUTS
Filed Nov. 12, 1965 4 Sheets-Sheet 1

Inventor,
Sidney R. Smith, Jr.
by Gilbert P. Tarleton
His Attorney.

Inventor,
Sidney R. Smith, Jr.
by Gilbert P. Tarleton
His Attorney.

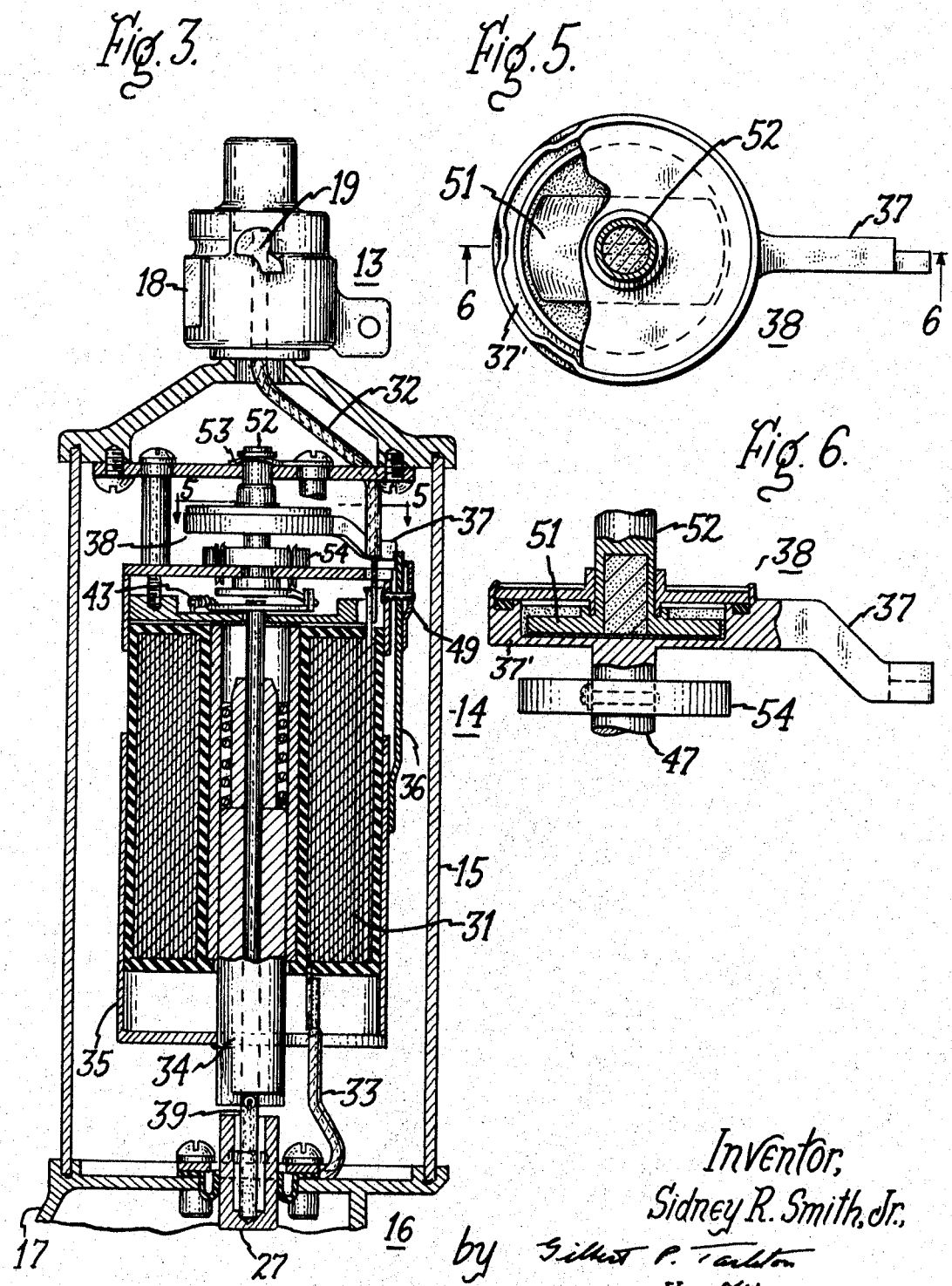

May 23, 1967
S. R. SMITH, JR
3,321,721
SECTIONALIZER FOR OPEN CUTOUTS
Filed Nov. 12, 1965
4 Sheets-Sheet 4
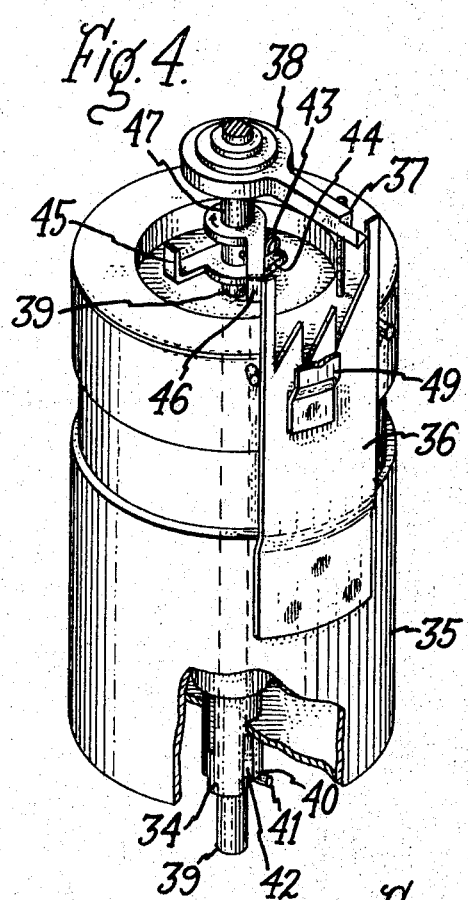
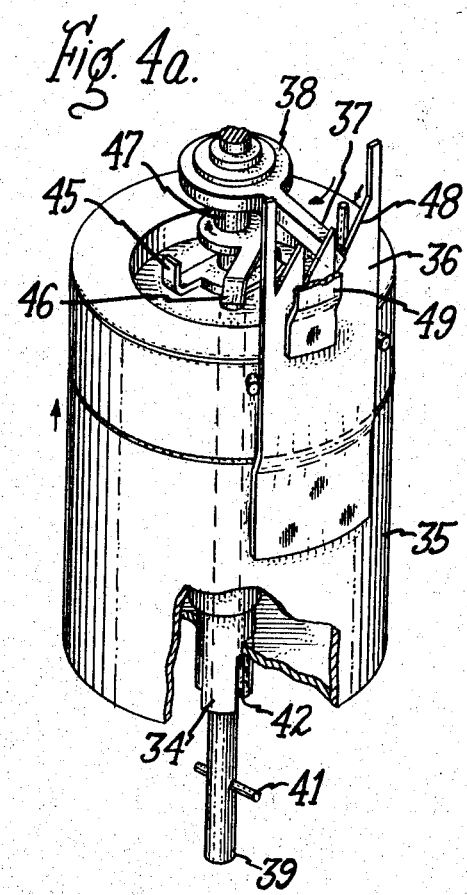
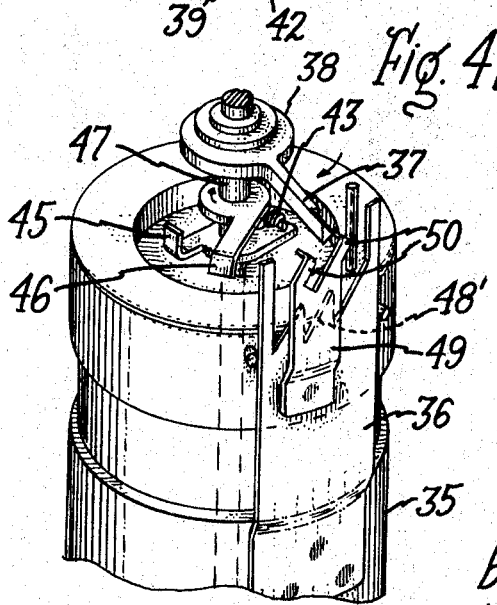
Inventor,
Sidney R. Smith, Jr.,
by Gilbert P. Tarleton
His Attorney.

United States Patent Office 3,321,721
Patented May 23, 1967

3,321,721
SECTIONALIZER FOR OPEN CUTOUTS
Sidney R. Smith, Jr., Stockbridge, Mass., assignor to General Electric Company, a corporation of New York
Filed Nov. 12, 1965, Ser. No. 507,395
6 Claims. (Cl. 335—32)

This invention relates to electrical overcurrent protective devices and more particularly to improvements in line sectionalizers for electric power distribution circuits.

A line sectionalizer is an adjunct of an automatic recloser. It is connected in circuit with but on the load side of the latter and like the latter it is a normally closed circuit breaker which opens in response to overcurrent. Unlike a recloser, however, it does not open at once upon the occurrence of overcurrent and it does not automatically reclose after it has opened. What it does is count impulses of overcurrent resulting from the cycling action of the recloser and before the recloser locks open it locks open thus sectionalizing the line by removing the presumably faulted section on its load side so that the recloser can reset itself and maintain service on the rest of the circuit. But for the sectionalizer, the recloser would lock open and interrupt service on the entire load side of its circuit. In other words, a sectionalizer allows the recloser to maintain service on the entire circuit if the condition, usually a fault, causing the overcurrent is temporary, and it removes only the faulted section of the circuit if the fault is permanent.

Suitable locations for line sectionalizers are where branch circuits connect to a main feeder containing a recloser. Many such locations already contain an open type fuse cutout.

Accordingly, an object of the invention is to provide a new and improved line sectionalizer which can be inserted in an open cutout frame in place of the usual fuse tube.

Another object of the invention is to provide a new and improved operating mechanism for a sectionalizer which makes it suitable for use in an open cutout frame.

The invention will be better understood from the following description taken in connection with the accompanying drawings and its scope will be pointed out in the appended claims.

Figure 2:
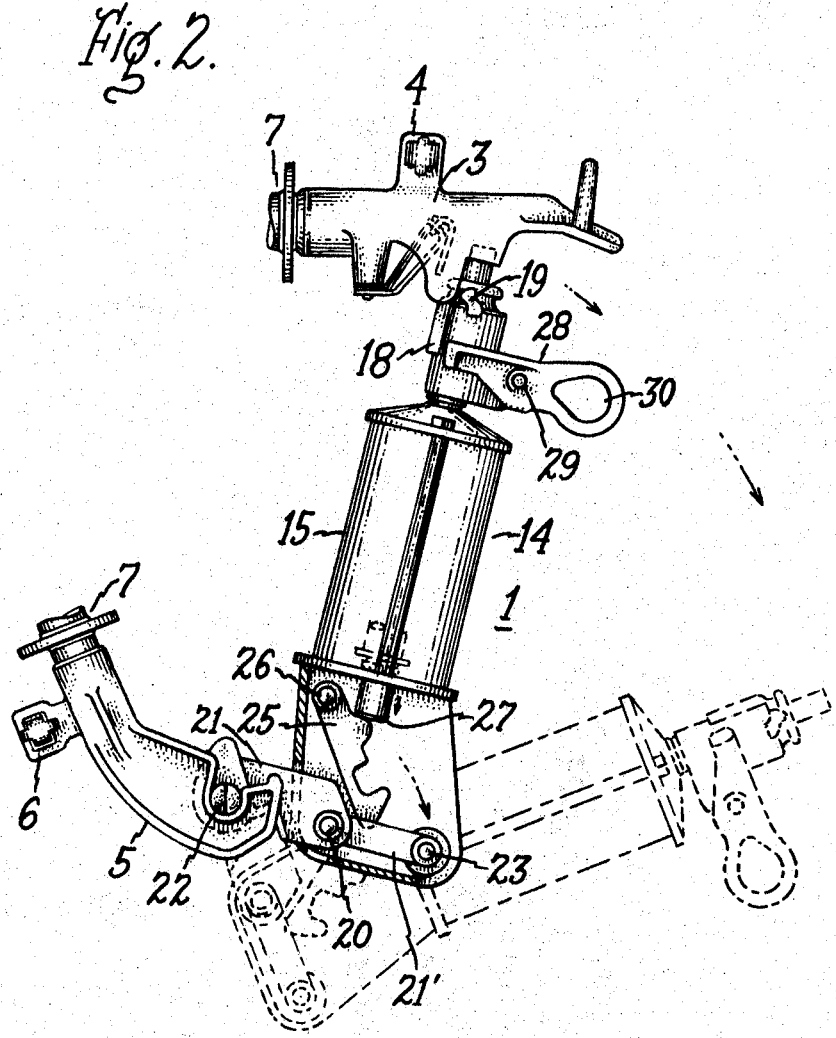

In the drawings,

FIG. 1 is a partly broken away side elevational view of an embodiment of the invention in its normally closed operating position, FIG. 2 is a view similar to FIG. 1 showing in full lines the change in position of the parts when the sectionalizer is just starting to open, and in dashed lines its position when it is about half way open, FIG. 3 is an enlarged half sectional view on the longitudinal center line of the operating mechanism of the sectionalizer, FIG. 4 is a perspective view of the operating mechanism in its normal position, the mechanism having been rotated slightly so as more clearly to show the ratchet plate, FIG. 4a is similar to FIG. 4 showing the change in position of the parts as a result of the first upward stroke of the solenoid plunger, FIG. 4b is similar to FIG. 4a showing the progressive change in the position of the parts as a result of the first downward stroke of the solenoid plunger, FIG. 5 is an enlarged sectional view of the timer taken on line 5—5 of FIG. 3, and FIG. 6 is a sectional view taken on line 6—6 of FIG. 5.

Referring now to the drawings and more particularly to FIG. 1, the sectionalizer is indicated at 1 as being mounted in the frame 2 of an open type cutout. The principal parts of the frame 2 are a so-called latch casting 3 with integral line terminal 4 and hinge casting 5 with integral line terminal 6. These castings may be supported in any suitable manner such as by resilient electrical insulator arms 7 seated in a yoke casting 8. The arms 7 may be made of any suitable material such as anti-creep tracking butyl rubber reinforced with a central fiber glass core (not shown). The latch casting 3 includes an integral latching notch 9 and a spring biased electrical contact 10. The hinge casting 5 includes a hook portion 11 having trunnion receiving sockets 12.

The sectionalizer 1 comprises an upper latched contact assembly 13, a central operating mechanism 14 in a cylindrical housing 15 and a releasable toggle mechanism 16 in a housing 17 attached to the lower end of the operating mechanism 14.

The upper latched contact assembly 13 comprises an electrical contact pad 18 for contact engagement with the contact 10 on the latch casting 13 and includes transversely extending ears or latch members 19 for cooperative engagement with the latch notch 9 of the latch casting 3. As shown, the parts 9 and 19 are in engagement thus holding the contacts 10 and 18 firmly together.

The toggle mechanism 16 comprises a rigid lever pivotally mounted at 20 in the housing 17 and extending in opposite directions therefrom. The lower portion 21 has trunnions 22 seated in the trunnion receiving recesses 12 of the hook portion 11 of the hinge casting 5. The other portion 21' of the lever pivoted at 20 has a projection 23 seated in a notch 24 of a catch member 25 pivoted at 26 in the housing 16. The latter can be actuated by a movable button 27 in the lower end of the operating mechanism.

With the sectionalizer in the position shown in FIG. 1, the circuit is completed between the external terminals 4 and 6 of the cutout frame through the contacts 10–18, the operating mechanism 1, the housing 17 and linkages of the toggle mechanism 16 and through the trunnion supports 12–22. The upper latch assembly 13 is provided with a pivoted latch release lever 28 pivotally mounted at 29 and provided with an eye 30 for receiving the hook of the switch stick. Thus the sectionalizer can be used as a disconnect switch by pulling downwardly on the eye 30 which will produce leverage tending to pry latch casting 3 and the hinge casting 5 apart which motion is permitted due to the resilience of the arms 7. In other words, the relative motion can be such that the transverse projections 19 are no longer retained by the notch portions 9 so that the contacts 10 and 18 can be opened by pivoting the entire device around the trunnions 22.

The automatic opening of the sectionalizer is somewhat different from the manual opening of the device as a disconnect switch. This automatic opening is shown in FIG. 2 where the button 27 has been pushed down by the operating mechanism 14 in a manner to be described hereinafter so as to pivot the lever 25 in a clockwise direction as viewed in FIG. 2 so as to release the projection 23 on the arm 21' which in effect causes the toggle mechanism to collapse so that the lower end of the sectionalizer drops vertically and swings outwardly to the right as viewed in the drawing, the two pivot points being around the axis of the trunnions 22 and around the pivot point 20. This causes the transverse extensions 19 to become unhooked from the notch 9 (see FIG. 1) so that the entire sectionalizer 1 can swing in a clockwise direction about the axis of the trunnions 22 as indicated by the dashed line showing of the position of the sectionalizer.

As shown in FIG. 3, the operating mechanism 14 in the housing 15 comprises a solenoid coil 31 positioned coaxially in the cylindrical housing 15. One electrical terminal of the coil 31 is connected by a lead 32 to the upper latched contact assembly 13 and thus to the contact 18. The other or lower end of the solenoid coil 31 is connected by a lead 33 to the toggle mechanism housing 17 which is made of conducting material such a brass. Extending into the bore of the solenoid coil 31 is a hollow reciprocable plunger 34 attached somewhat above its lower end to a cup member 35 which surrounds the coil 31. Attached to the cup 35 is a ratchet plate 36 shown more clearly in FIGS. 4, 4a and 4b for actuating in a stepwise manner an arm 37 of a timer mechanism 38 mounted for rotation around its axis and for reciprocation along its axis is an elongated rod or shaft 39 extending through the bore of the plunger 34 and into the button 27 at its lower end and above the top of the coil 31 at its upper end.

The operation of the mechanism 14 illustrated in FIG. 3 can best be explained by reference to FIGS. 4, 4a and 4b which show the principal parts in perspective view partly broken away and oriented so as better to show the ratchet mechanism.

Referring to FIG. 4, the plunger 34 at its lower end has a recessed shelf or flat surface 40 normally resting on a transverse pin 41 through the shaft 39. The lower end of the plunger also has a slot 42 so that when the shaft 39 and pin 41 are rotated a sufficient amount in a clockwise direction as viewed from the top in FIG. 4 the pin 41 will enter the slot 42 and allow the plunger 34 to drop by gravity into engagement with the button 27 moving the latter downwardly so as to trip the toggle mechanism in the manner already described.

The angular position of the shaft 39 and pin 41 is maintained in a normal position by a small coil spring 43 at the top of the solenoid coil which is attached to an arm 44 fixedly attached to the upper end of the shaft 39. There is another arm 45 also fixedly attached to the upper end of the shaft 39 which is engagable by the end of an arm 46 attached to a second shaft 47 to which the timer 38 and its arm 37 are attached.

In FIG. 4 the parts are in their relative positions when the device is in normal operation. Should there be a surge of overcurrent through the solenoid coil 31, there will be an upward stroke of the plunger 34 and cup 35 to the position shown in FIG. 4a which causes an inclined surface 48 of the ratchet plate 36 to notch or index the timer arm 37 through a given angle of movement in a clockwise direction as viewed from the top of FIG. 4a. Normally such surge of overcurrent will cause the recloser in the circuit to open momentarily thus causing a first downward stroke of the cup 35 and ratchet plate 36 to the downward position shown in FIG. 4b.

FIG. 4b shows that there is an auxiliary ratchet plate 49, having ratchet fingers 50, which is attached to the main ratchet plate 36. Thus on the first downward stroke the ratchet finger 50 notches or indexes the arm 37 clockwise through a somewhat smaller angle than the main ratchet does on its upward strokes. This positions the arm 37 over the next inclined surface 48' of the main ratchet plate 36 so that if the fault or other condition which causes overcurrent in the circuit when the recloser recloses still exists, there will be a second upward stroke of the cup 35 thus further indexing the arm 37 around. This action will continue cyclically until on the third upward stroke the second shaft 47 will be rotated sufficiently so that arm 46 thereon engages the arm 45 on the first shaft 39 and rotates it enough to cause the pin 41 to enter the slot 42 so that on the third downward stroke of the cup 35 it can fall far enough to trip the toggle mechanism in the manner already described.

In order to provide time delayed resetting of the mechanism after it has dropped out or if the fault clears before the sectionalizer drops out and opens, the timer mechanism 38 is provided. As shown in FIGS. 5 and 6 it comprises a cup shaped member 37' integral with the arm 37 in which there is mounted a so-called rotor member 51 on a third shaft 52 which by means of spring washers 53 can rotate with frictional drag. The cup shaped portion of the timer 38 is filled with viscous fluid such as silicone fluid and a spiral spring like a watch spring 54 is constantly biasing the cup shaped portion 37' of the timer 38 and the arm 37 to its normal position as viewed in FIG. 4, i.e. constantly biasing it in a counterclockwise direction.

During the power strokes of the mechanism when the indexing motion of the arm 37 is rapid, the parts of the timer mechanism all turn together, there being slippage in the frictional mounting of the shaft 52 in its bearing. However, whenever the plunger cup 35 is in its downward position the contant although slight counterclockwise torque of the watch spring 54 tends to move the arm 37 to its reset position. In this resetting operation, the torque of the spring 54 is not sufficient to cause slippage of the frictional mounting of the shaft 52 so that the delayed return motion of the arm 37 is caused by the relatively slow flow of the silicone fluid over the then stationary rotor surfaces as the timer cup and arm 37 are rotated backwards or counterclockwise by the watch spring 54.

While there has been shown and described a particular embodiment of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. A line sectionalizer for use in an open cutout frame of the type having an upper latch contact and a lower trunnion receiving hinge contact, said sectionalizer comprising an elongated cylindrical housing, a latched contact mounted on the upper end of said housing and extending axially outwardly therefrom for latched closed engagement with the latch contact of a cutout frame, a latched pivoted trunnion mounted on the other end of said housing and extending outwardly therefrom for seating in the hinge contact of a cutout frame, said housing containing a solenoid coil mounted coaxially therein, means for connecting said solenoid coil between said latched contact and said trunnion, a reciprocable cup surrounding the lower part of said solenoid coil and having a hollow solenoid plunger extending centrally through the bottom of said cup in both directions therefrom, a rotatable shaft extending through the bore of said plunger from the top of said solenoid coil to below the bottom outer end of said plunger, a cross pin through the lower end of said shaft for normally limiting the downward gravity biased movement of said plunger, a crossarm on the other end of said shaft spring biased against a stop for normally maintaining said pin in a given angular position, a slot in the lower end of said plunger for permitting the lower end of said plunger to fall past said pin when said shaft is rotated through an angle sufficient to cause registration between said pin and slot, the lower end of said plunger when it falls past said pin engaging and releasing the latch holding said pivoted trunnion, a second rotatable shaft mounted coaxially with and above the first shaft, said second shaft having a pair of transverse arms one of which engages the spring biased arm of the first shaft when the second shaft is rotated through a given angle, the other arm of said second shaft extending radially outward beyond the rim of said cup, a notched ratchet plate mounted on the rim of said cup below said other arm for notching said second shaft around a step at a time for each upward stroke of said cup when said solenoid coil is energized with overcurrent, and timer means for slowly returning said second shaft to a normal position.

2. A sectionalizer as in claim 1 in which said timer includes a relatively movable plate and body of viscous fluid.

3. A sectionalizer as in claim 1 in which said ratchet plate is double acting and advances said other arm in long steps on upward strokes of said cup and in short steps in the same direction on downward strokes of said cup.

4. A selectionalizer as in claim 1 in which auxiliary ratchet fingers are attached to said ratchet plate for advancing said other arm in short steps on downward strokes of said cup when said solenoid coil is deenergized.

5. A sectionalizer as in claim 1 in which said timer includes a body of silicone fluid rotatable with said second shaft about the axis thereof, a third shaft mounted above and coaxially with the second shaft, a transverse blade fixedly attached to an end of said third shaft, said blade being immersed in said fluid, a coiled spring for biasing and second shaft in the return direction to its normal position against a stop, and friction brake means for permitting said third shaft and blade to turn with said second shaft when the latter is advanced stepwise by said ratchet while holding said third shaft from reverse rotation while said coiled spring returns said second shaft to its normal position, said return rotation of said second shaft being delayed by the drag produced by moving said fluid relative to said blade.

6. A line sectionalizer for use in an open cutout frame of the type having an upper latch contact and a lower trunnion receiving hinge contact, said sectionalizer comprising an elongated cylindrical housing, a latched contact mounted on the upper end of said housing and extending axially outwardly therefrom for latched closed engagement with the latch contact of a cutout frame, a latched pivoted trunnion mounted on the other end of said housing and extending outwardly therefrom for seating in the hinge contact of said cutout frame, said housing containing a solenoid coil mounted coaxially therein, means for connecting said solenoid coil between said latched contact and said trunnion, a reciprocable plunger for said coil holding means for normally limiting the downward gravity biased movement of said plunger and timer restored counting means respectively to a predetermined movement of upward strokes of said plunger within a given time for releasing said holding means and allowing said plunger to fall far enough to trip the latch of said pivoted trunnion to cause said sectionalizer to drop and swing open.

No references cited.

BERNARD A. GILHEANY, *Primary Examiner.*

H. BROOME, *Assistant Examiner.*